Jan. 5, 1960     R. L. NORTON     2,920,225
ELECTRON TUBE BASE STRUCTURE

Filed May 1, 1957

INVENTOR.
ROBERT L. NORTON
BY
Townsend and Townsend
ATTORNEYS

United States Patent Office 2,920,225
Patented Jan. 5, 1960

2,920,225

ELECTRON TUBE BASE STRUCTURE

Robert L. Norton, Santa Barbara, Calif., assignor to Penta Laboratories, Inc., Santa Barbara, Calif., a corporation of California Application May 1, 1957, Serial No. 656,420

5 Claims. (Cl. 313—262)

This invention relates to a vacuum tube header or base structure and more particularly to a base structure for vacuum tubes of the type having coaxial electrode connector rings.

In the prior art as illustrated in United States Patent Numbers 2,471,005 and 2,441,349 it is observed that electrode or vacuum tubes have been conventionally fabricated using cylindrical glass, Pyrex or ceramic supporting and insulating members between coaxially aligned electrode connector rings.

The improvement of this invention comprises, for a principal object, the inclusion of a dielectric annular ring joining two electrode connector rings in spaced relation in which the dielectric material is disposed in a plane substantially radial of the longitudinal axis of the tube.

A feature and advantage of this invention is that the electrode connector rings may be positioned in planes substantially closer together than with the cylindrical dielectric joining structure as taught in the prior art, thus rendering the tube substanially more compact than heretofore possible.

By virtue of the aforesaid placement of electrode connector rings a shorter electrical path between electrode members and the connecting terminals is possible thus reducing the inner-electrode capacity within the tube.

Another feature and advantage of this invention by virtue of the novel structure afforded is that the electrode connector rings may be placed in a horizontal jig whereat the dielecrtic joining material may be heated to render the dielectric material in a plastic condition so that the two rings are joined together while held in precise radial and axial alignment in the jig.

A further feature and advantage of this invention is that the jig employed to hold the connector rings in registration may be of a simpler and more economical structure than the jigs conventionally employed in the tubes heretofore used in the prior art thus affording greater economy in the fabrication of the header structure while insuring an extremely accurate positioning of the respective parts thereof.

A further object of this invention is to provide a novel process for joining two electrode connector rings by first joining the electrode rings by a glass annular ring and thence positioning the electrode members in precise radial and axial alignment in a substantially horizontal jig arrangement while the glass ring is heated to render the glass in a plastic condition.

Other objects of the present invention will become apparent upon reading the following specification and referring to the accompanying drawings in which similar characters of reference represent corresponding parts in each of the several views.

Figure 2:
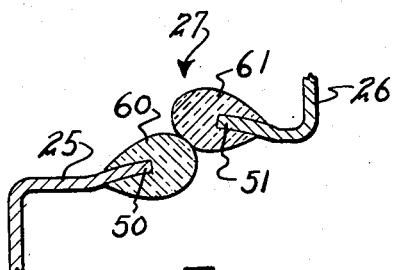
Fig. 2 is an enlarged fragmentary detailed view of the glass joining means for the two coaxially aligned electrode connector rings shown prior to being fused.
Figure 1:
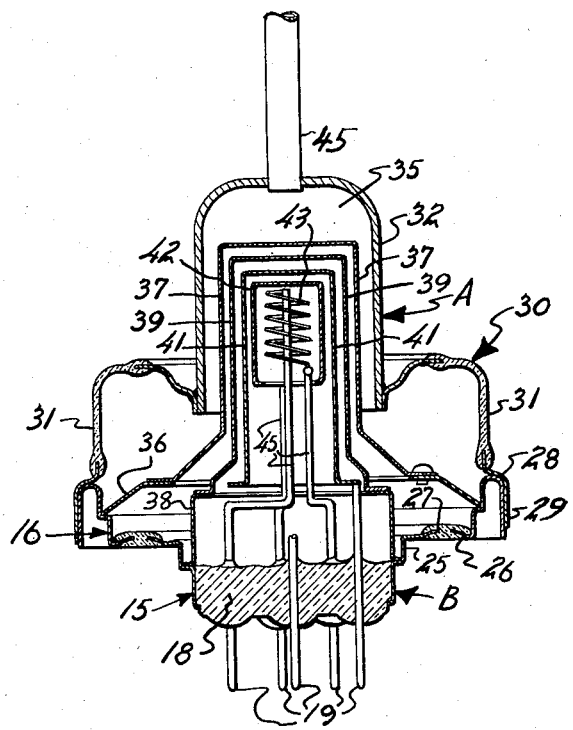
Fig. 1 is a cross-sectional view of the tube base or header structure.
Figure 3:
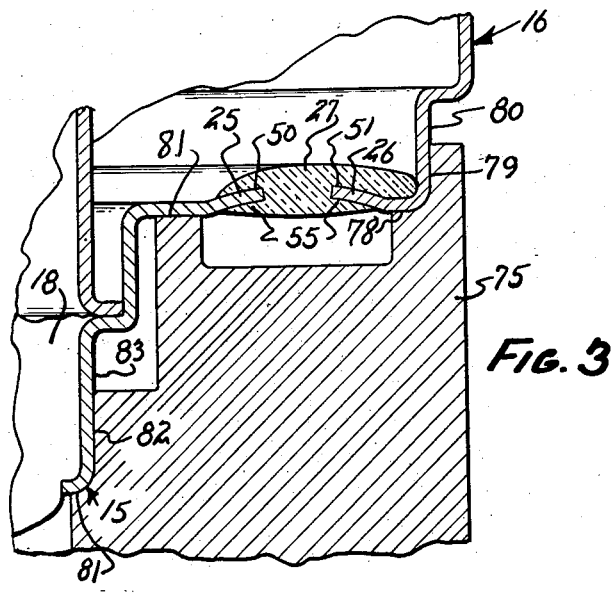
Fig. 3 is a cross-sectional view of the tube header structure shown in relation to a jig member employed to align the two electrode connector rings.

Referring now to the drawings and with particular reference to Figs. 1, 2 and 3 the tube header structure of the preferred embodiment of the invention comprises an electrode connector ring 15 and an electrode connector ring 16 mounted above ring 15 and coaxially aligned therewith. Ring 16 is of substantially larger diameter than ring 15 so that ring 15 is positioned interiorly of ring 16.

The bottom center portion of ring 15 is formed of glass as at 18 through which electrode connector pins 19 project exteriorly of the tube. The upper edge of ring 15 is provided with an outwardly projecting radial annular flange 25 and ring 16 is provided with an inwardly projecting annular flange 26. The two flanges 25 and 26 are arranged in substantially coplanar spaced alignment on a plane perpendicular to the longitudinal axis of the tube.

A glass ring 27 is formed to join the two flanges 25 and 26 whereat the glass ring is arranged in substantially coplanar relation to the two flanges 25 and 26. Ring 16 on its top portion as at 28 is provided with a downwardly depending annular leg 29 formed to engage a complementary tube socket.

An envelope 30 comprising a substantially cylindrical glass base portion 31 and a metallic anode portion 32 is mounted on top portion 28 of ring 16. An evacuated chamber 35 is thus formed within the envelope sealed to the atmosphere.

Ring 16 has an inwardly projecting upper radial flange member 36 arranged to support a suppressor grid structure 37 of the tube. Ring 15 is provided with the inwardly projecting radial flange 38 arranged to support a screen grid structure 39. Interiorly of the screen grid is a control grid 41, a cathode 42 and a heater or filament 43. The control grid, cathode and heater are each supported by upwardly projecting rods 45 connected to and supported by pin members 19 mounted in glass portion 18 of ring 15. Thus the various pins 19 are connected to cathode 42, heater 43 and control grid 41. Ring 15 is connected to screen grid 39 and ring 16 is connected to suppressor grid 37. A plate cap 48 is provided to form the electrical connection for anode 32 of the vacuum tube.

Referring specifically to Figs. 1 and 3 it is noted that flanges 25 and 26 are both formed with upwardly projecting edges or end portions 50 and 51 respectively to form a pocket area 55 on the underside of the two flange members and between the same to receive glass ring 27. Glass ring 27 comprises an integral glass annulus joining the two rings 15 and 16 together with flanges 25 and 26 disposed in spaced relation with respect to each other and wherein the glass annulus 27 projects above the top of flange members 25 and 26 and below the flanges within the pocket area 55. By this means the bottom portion of the glass seal is substantially coplanar with the bottom of the flanges while still allowing sufficient mass of glass both above and below the edges of flange members 25 and 26 to structurally support the two ring members 15 and 16.

To form the header structure of this invention edges 50 and 51 of flanges 25 and 26 respectively are each separately provided with annular glass beads 60 and 61 respectively. The tube is thus formed in two integral units. Unit A comprising ring 16 and envelope 30 and unit B comprising ring 15 and electrodes supported thereby. The first step in joining unit A to unit B comprises the step of supporting the two units in a lathe with the two rings 15 and 16 in substantially radial and axial alignment whereat the two beads 60 and 61 overlap so as to abut each other. Thence the beads are heated sufficiently to fuse together to form an integral structure comprising units A and B upon cooling. Thereafter the tube structure is removed from the lathe and placed in a jig 75 as shown in Fig. 3. Jig 75 is provided with a first annular horizontal surface 78 to support the underside of flange 26 and a vertical annular surface 79 to engage the outer side wall 80 of ring 16, a horizontal annular surface 81 to support the underside of ring 15 and a vertical annular surface 82 to engage the outer side wall 83 of ring 15. Surfaces 78, 79, 81 and 82 are formed in precise alignment so that when rings 15 and 16 are in alignment within the jig, rings 15 and 16 will be in precise radial and axial alignment with respect to each other. After the tube is placed in the jig glass ring 27 is heated until the glass in the plastic condition whereafter rings 15 and 16 are each positioned against their respective aligned surfaces of jig 75. Glass ring 27 is thence allowed to cool whereafter the tube is removed from the jig with the two rings 15 and 16 in precise alignment. The area of the jig immediately adjacent the underside of glass ring 27 is cut out so as to be completely clear from contact with the glass ring. It has been found by this means that the surface tension of the glass is sufficient to cause the underside of the glass to flow to form an even smooth underside surface for ring 27.

Figure 4:
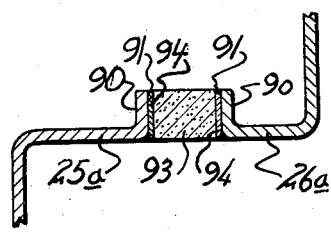
Fig. 4 is a fragmentary sectional view of the tube header structure showing a modification wherein ceramic material is used to join the two electrode connector rings.

In Fig. 4 there is shown a modification of the invention in which the dielectric means joining units A and B is formed of ceramic material. When a ceramic material is employed to join unit A to unit B the edges of the flanges indicated at 25ª and 26ª of the modified structure are disposed to turn upwardly as at 90 to form annular faces 91 to which a ring of preformed ceramic material 93 may be attached. The ceramic material is metallized on the flange engaging surfaces as at 94 so that upon heating the ceramic material the metallized surfaces will be brazed to the flanges. It is contemplated in the use of ceramic materials that the two units A and B would be placed in a jig similar to jig 75 of Fig. 3 so that the two units would be in precise alignment during brazing of the ceramic ring 93 to join the two units together.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In a vacuum tube the combination of, a base structure comprising: first and second coaxial electrode connector rings; said first ring disposed below and concentrically interior of said second ring; said first ring having an annular metal flange adjacent the top of said ring projecting outwardly to define an end portion disposed on a plane substantially normal to the longitudinal axis of said tube; said second ring having an inwardly projecting annular metal flange formed to provide an end portion disposed in substantially coplanar spaced relation to the end portion of the flange of said first ring; and dielectric sealing and supporting means joining the end portions of the two flanges together to support said second ring relative to said first ring; the end portions of said flanges and said sealing and supporting means forming a unitary bottom face aligned on a plane normal to the longitudinal axis of said tube.

2. In a vacuum tube the combination according to claim 1 and wherein the dielectric sealing and supporting means comprises glass.

3. In a vacuum tube the combination according to claim 1 and wherein the dielectric sealing and supporting means comprises ceramic material.

4. In a vacuum tube the combination according to claim 1 and wherein said tube has a screen grid and a suppressor grid, said first ring being electrically connected to said screen grid and said second ring being connected to said suppressor grid.

5. In a vacuum tube the combination of, a base structure comprising: first and second coaxial electrode connector rings; said first ring disposed below and concentrically interiorly of said second ring; said first ring having an annular metal flange adjacent the top of said ring; said second ring having an inwardly projecting annular metal flange in coplanar spaced relation to the flange of said first ring; the ends of said flanges formed to project upwardly to form a pocket between the bottom radial plane of the flanges and the tip portions of the flanges; and dielectric sealing and supporting means joining the two flanges together; said dielectric sealing means disposed in the pocket whereby the bottom portion of said sealing means is substantially coplanar with the bottom radial plane of said flanges whereby said second ring is supported by said first ring.

References Cited in the file of this patent

UNITED STATES PATENTS

| | | |
|---|---|---|
| 2,245,613 | Schulte | June 17, 1941 |
| 2,275,490 | Barber | Mar. 10, 1942 |
| 2,339,850 | Goodale | Jan. 25, 1944 |
| 2,341,920 | Hull | Feb. 15, 1944 |
| 2,415,412 | Buchwalt et al. | Feb. 11, 1947 |
| 2,697,796 | Eitel et al. | Dec. 21, 1954 |